United States Patent [19]

Gmeinder

[11] 4,168,454
[45] Sep. 18, 1979

[54] CIRCUIT ARRANGEMENT FOR CONTROLLING THE SPEED OF A D.C. MOTOR

[75] Inventor: Hermann Gmeinder, Mettenberg über Rot, Fed. Rep. of Germany

[73] Assignee: Kaltenbach & Voigt GmbH & Co., Biberach an der Riss, Fed. Rep. of Germany

[21] Appl. No.: 796,814

[22] Filed: May 13, 1977

[30] Foreign Application Priority Data

May 20, 1976 [DE] Fed. Rep. of Germany ....... 2622656

[51] Int. Cl.² .............................................. H02P 5/00
[52] U.S. Cl. .................................... 318/331; 318/332
[58] Field of Search ................................ 318/331, 332

[56] References Cited

U.S. PATENT DOCUMENTS

| | | | |
|---|---|---|---|
| 3,437,901 | 4/1969 | Slotkowski | 318/332 |
| 3,599,064 | 8/1971 | Friedman | 318/331 |
| 3,716,771 | 2/1973 | Maynard | 318/331 |
| 3,735,225 | 5/1973 | Raatz | 318/332 |
| 3,737,748 | 6/1973 | Teders | 318/331 |
| 3,826,961 | 7/1974 | Hayase et al. | 318/332 |
| 3,855,511 | 12/1974 | Smith | 318/332 |
| 3,947,737 | 3/1976 | Kimura et al. | 318/331 |
| 3,961,688 | 6/1976 | Maynard | 187/29 R |

Primary Examiner—Gene Z. Rubinson
Assistant Examiner—Eugene S. Indyk
Attorney, Agent, or Firm—Haseltine, Lake & Waters

[57] ABSTRACT

A circuit arrangement for controlling the speed of a D.C. motor, and particularly a motor for operating dental instruments. The circuit arrangement comprises a reference signal generator, a comparator which compares the reference signal with a second signal derived from the motor armature voltage to produce a regulating signal, and a regulator which is connected in the motor armature circuit and which is controlled by the regulating signal to provide a fluctuating D.C. voltage supply to the armature. A compensator is arranged to produce a correction signal which is dependent on the instantaneous motor armature current, the compensator being connected to the reference signal generator for summation of the correction signal with the reference signal. This provides for improved response in the supply of power to the motor, for example, when the motor loading is increased such as to increase the armature current but decrease the armature voltage.

3 Claims, 2 Drawing Figures

CIRCUIT ARRANGEMENT FOR CONTROLLING THE SPEED OF A D.C. MOTOR

FIELD OF THE INVENTION

This invention relates to a circuit arrangement for regulating the speed of a D.C. motor having an armature and comprising; a generator for supplying a first reference signal; a comparator for supplying a regulating signal derived from the supply to the comparator of the first reference signal and a second signal dependent upon the armature voltage of the motor; and a regulator controlled by the regulating signal and connectible in the armature circuit of the motor for regulating the power therein.

DESCRIPTION OF THE PRIOR ART

A circuit arrangement of the above type is known from German Pat. No. 1,266,859. However, this known arrangment operates as a series regulator, and a final control element of the regulator has its resistance varied as a function of the loading of the motor.

It is an object of the invention to provide a circuit arrangement having a wider regulating range and improved regulating sensitivity and response sensitivity.

SUMMARY OF THE INVENTION

According to the invention there is provided a circuit arrangement for regulating the speed of a D.C. motor having an armature and comprising:

a generator for supplying a first reference signal;

a comparator connected to said generator and having a first input to receive said first reference signal, a second input to receive a second signal dependent upon the armature voltage of the motor, and an output for supplying a regulating signal derived from said first reference signal and said second signal;

a regulator connected to said comparator to receive said regulating signal and connectable in the armature circuit of the motor to regulate the power therein;

and a compensator connectible to said motor to generate a correction signal corresponding to the instantaneous value of motor armature current, said compensator being connected to said generator for summation of said correction signal with said first reference signal.

In contrast to the known circuit arrangement which has only one feedback loop, the circuit arrangement in accordance with the invention contains two feedback loops and is therefore able to provide a solution to the problem.

Also known are circuit arrangements of the initially described kind wherein the final control element is an electronic switching element. Thus, for example in the switching arrangement in accordance with German Offenlegungsschrift 1,438,227, the final control element is constituted by a thyratron. In this case, for the purpose of producing the regulating voltage, an actual value voltage, derived from the armature voltage of the motor with an adjustable direct-current voltage, is added to the alternating striking voltage of the thyratron. Although digitally operating regulating circuits of this kind have a higher efficiency than continuously operating regulating circuits, in the last-mentioned known arrangement, consierable energy is required for the regulating part, i.e. for producing the regulating voltage and for controlling the thyratron.

Based on the last-mentioned known circuit arrangement, a further object of the present invention is to increase efficiency, i.e. the ratio of effective power to the power loss involved in regulation.

The last-mentioned object is achieved in that the regulator comprises an electronic switching element and the comparator has a threshold characteristic to provide a high or a low output voltage level depending upon whether the first signal exceeds or falls below the second signal.

This last-described step results in not only the electronic switching element operating digitally but also the comparator, i.e. it can occupy only one of two switching positions. Thus, the required regulation, in which the loss is particularly low, is achieved.

The comparator may be a Schmitt trigger having low hysteresis.

In order to render the loss-affected transition between the two above-mentioned switching positions as short as possible, it is preferred to connect, between the comparator and the electronic switching element, a pulse shaper which renders the flanks of the switching pulses, supplied to the electronic switching element, as steep as possible.

The electronic switching element may be a switching transistor.

In accordance with a further preferred feature, a summation signal, (formed from the first reference signal and the correction signal), is fed to the non-inverting input of an operational amplifier, the inverting input of the operational amplifier is connected to a reference voltage potential by way of an adjustable resistor, and to the output of the operational amplifier by way of a feedback resistor, and the output of the operational amplifier is connected to the first input of the comparator.

The operational amplifier may operate as a proportional amplifier stage, and the degree of amplification depends upon the ratio of the resistance of the adjustable resistor to that of the feedback resistor.

The non-inverting input of the operational amplifier can be connected to the tap of a potentiometer, to one terminal of which is fed the first signal, and to its other terminal, the correction signal (attenuated by way of a measuring resistor in the motor circuit). The required value for the motor speed that is to be regulated can be set by means of the potentiometer.

To ensure that the motor runs in a smooth and uniform manner, the pulsing direct-current voltage, produced by the electronic switching element and serving as the armature voltage for the motor, can be smoothed by means of a filter element.

DESCRIPTION OF THE PREFERRED EMBODIMENT

Figure 1:
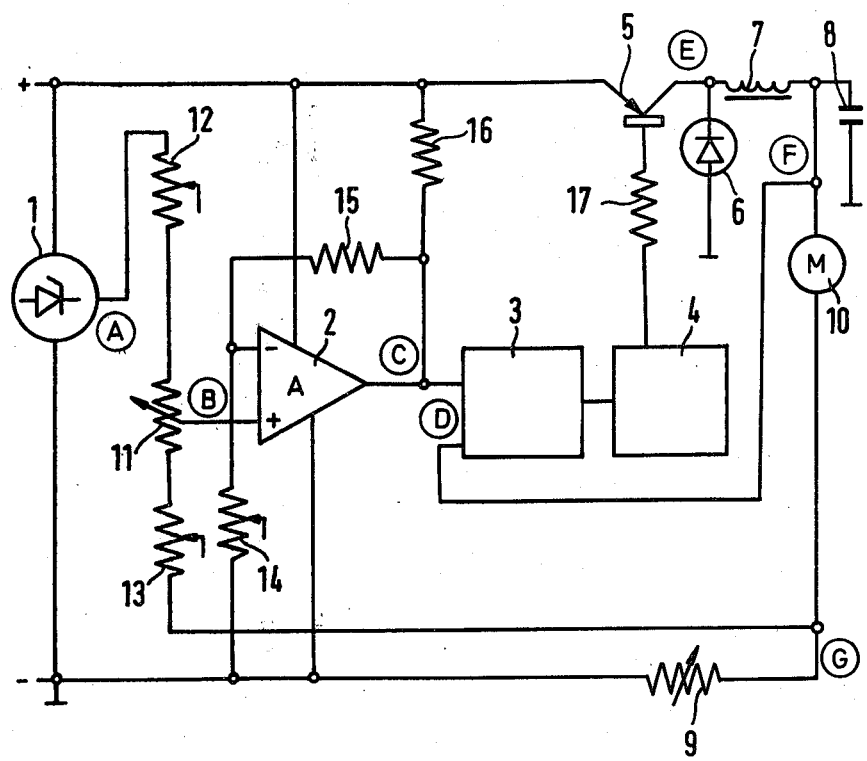
FIG. 1 is a block circuit diagram of a switching arrangement according to the invention.
Figure 2:
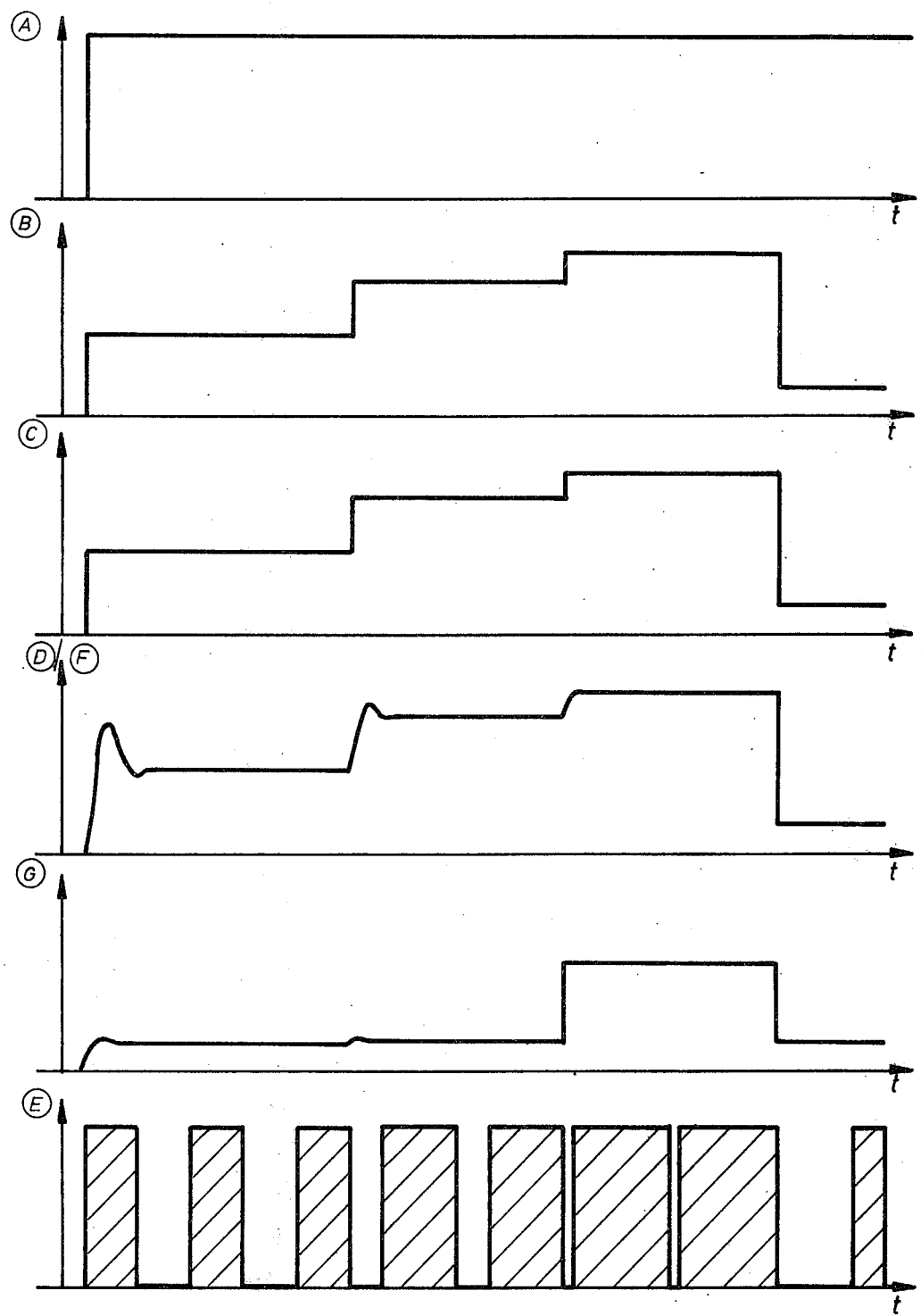
FIG. 2 is a graph illustrating the variation in signal strengths with time at selected positions in the circuit arrangement.

The circuit arrangement shown in FIG. 1 regulates the speed of a direct current motor 10 which is supplied by a direct-current voltage source, not illustrated. Arranged in series with the motor 10 is the emitter - collector path of a switching transistor 5. This switching transistor 5 is changed over from its non-conductive to its conductive state and vice versa by switching pulses.

A filter choke 7 is connected between the collector of the switching transistor 5 and one of the terminals of the motor 10. Also, a filter capacitor 8 leads from said terminal of the motor 10 to earth. The choke 7 and the capacitor 8 smooth the pulsing direct-current voltage applied to the motor 10. To prevent destruction of the switching transistor 5 by voltage peaks occurring at the filter choke 7 during the various switching operations, a protective diode 6 is connected from the collector of the transistor 5 to ground. The diode 6 is of such polarity that it is blocked in relation to the direct-current voltage supply for the motor 10.

The purpose of the circuit arrangement is to regulate the speed of the motor 10. In order to produce a required reference signal, a required-value reference voltage generator 1 is connected between the positive and negative poles of the voltage source. An adjustable resistor 12, a potentiometer 11, a further adjustable resistor 13 and a measuring resistor 9 are connected in series across the output of the generator 1. The measuring resistor 9 is also arranged in series with the motor 10 in the motor circuit.

Thus, the required-value reference signal (voltage) from the generator 1 is fed to one terminal of the potentiometer 11 via the adjustable resistor 12, whereas a voltage which is attenuated by way of the measuring resistor 9 (and is proportional to the motor current) comprises a second signal which is fed to the outer terminal of the potentiometer 11. The last-mentioned voltage, attenuated by way of the measuring resistor 9, will be referred to hereinafter as the corretion signal. Thus, a sum voltage, made up of the first reference signal and the second, correction signal, occurs at the tap of the potentiometer 11.

The sum voltage is fed to the non-inverting input of an operational amplifier 2. The inverting input of the operational amplifier 2 is connected to ground by way of an adjustable resistor 14. Furthermore, the inverting input of the operational amplifier 2 is connected, by way of a feedback resistor 15, to the output of the operational amplifier 2. The output of the operational amplifier 2 is connected, by way of a ballast resistor 16, to the positive terminal of the voltage source. In this circuit arrangement, the operational amplifier 2 operates as a proportional amplifier. Its degree of amplification depends upon the ratio of the resistance of the feedback resistor 15 to that of the adjustable resistor 14. By adjusting the resistor 14 it is thus possible to vary the degree of amplification of the operational amplifier 2. The amplified sum voltage thus occurs at the output of the operational amplifier.

The amplified sum voltage at the output of the operational amplifier 2 is fed to one of the inputs of a comparator comprising a Schmitt trigger 3. The armature voltage, attenuated by way of the motor, is fed to the other input of the Schmitt trigger 3. Depending upon which of the voltages at the two inputs of the Schmitt trigger 3 is greater than the other, the Schmitt trigger switches over into one or the other position. The voltage pulses occurring at the output of the Schmitt trigger 3 are passed to a pulse shaper 4. This reshapes the pulses in such a way that they have particularly steep flanks. These switching pulses are then supplied to the base of the transistor 5 by way of a resistor 17. The frequency at which the switching transistor is reversed is dependent, on the one hand, upon the hysteresis of the Schmitt trigger 3 and, on the other hand, upon the degree of amplification of the operational amplifier 2.

The rating is preferably so selected that the switching frequency varies between 500 Hz and 5 kHz.

The switching arrangement operates in the following manner: If, as a result of loading of the motor 10, the armature voltage drops, by the Schmitt trigger 3 switches the transistor 5, by way of the pulse shaper 4, to the conductive state. This offsets attenuation of the armature voltage by way of the motor 10, and compensates for the moment of the motor loading by an increased motor torque.

As a result of an increase in load, not only does the armature voltage drop, but the motor current also rises. Thus, the correction voltage, attenuated by way of the measuring resistor 9, rises. Consequently, the sum voltage at the non-inverting input of the operational amplifier 2 as well as the amplified sum voltage at the output of the operational amplifier 2 also rise. Thus, while the actual-value voltage drops at one of the inputs of the Schmitt trigger 3, the corrected required-value voltage (amplified sum voltage) at the same time rises at the other input. It will thus be seen that an amplified and more rapid regulating effect can be achieved.

The mode of operation of the switching arrangement can be seen from the pulse diagrams. The constant required-value reference voltage occurs at the point A of the circuit.

At point B occurs the sum voltage which is made up of the required-value reference voltage and the correction voltage derived from the point G. The first jump in the sum voltage is caused by adjustment of the potentiometer 11 for the purpose of resetting the required value for the speed. The second jump is a consequence of increased loading of the motor. It occurs through a corresponding jump in the motor current or the correction voltage at point G.

The voltage at point C is proportional but amplified relative to the voltage at point B.

The actual-value voltage, i.e. the armature voltage of the motor, occurs at points D and F. It should be noted that the second jump in the curve occurs as a result of increased loading of the motor and that it is retroactive on the corresponding input of the Schmitt trigger 3.

The correction voltage corresponding to the motor current can be tapped at point G. It should be noted that a change in the required value due to adjustment of the potentiometer 11 may affect the motor current. On the other hand, a change in the loading of the motor causes a considerable jump.

The voltage pulses, serving to produce the armature voltage of the motor, occur at point E. It will be seen that the keying ratio of the voltage pulses varies in dependence upon changes in the required value resulting from adjustment of the potentiometer 11, as well as in dependence upon changes in the loading of the motor 10. By integration, i.e. by smoothing the voltage pulses by means of the filter choke 7 and the filter condenser 8, the armature voltage then occurs at points F and D.

Finally, it might be mentioned that an efficiency of approximately 80% can be obtained with the circuit arrangement described with reference to the drawing, whereas an efficiency of only about 15% is achieved with a known series regulator. The increased efficiency carries the advantage that there is less generation of unwanted heat so that the cooling medium requirements are reduced.

The circuit arrangement according to the invention is particularly suitable for use in regulating the speed of an electric motor driving a dental instrument, in which the reduced requirement for cooling media for the motor is advantageous. However, it should be understood that the circuit arrangement according to the invention is not limited to use with motors employed with dental instruments and handpieces.

I claim:

1. A circuit arrangement for controlling the speed of a D.C. motor comprising: first and second terminals for connection to a voltage source, reference voltage means connected to said terminals for supplying a first reference signal; an electronic switching means having a control input for connecting said first terminal to one terminal of the motor; feedback resistor means for connecting the other terminal of the motor to said second terminal; first resistor means connected across said first and second terminals; said first resistor means having a tap; second resistor means connected between the output of said reference voltage means and the junction of said feedback resistor means and said other terminal of the motor; said second resistor means having a tap; proportional operational amplifier means having first and second difference inputs and an output; means connecting said first difference input to the tap of said first resistor means; means connecting said second difference input to the tap of said second resistor means; and pulse generator means including a Schmitt-trigger circuit having first and second inputs and an output, the first input of the pulse generator means being connected to the output of the operational amplifier means, the second input being connected to said one terminal of the motor, the output of the pulse generator means being connected to the control input of said electronic switching means.

2. A circuit arrangement according to claim 1, wherein said pulse generator means includes a pulse shaper.

3. A circuit arrangement according to claim 1, including filter means for smoothing the pulsing voltage produced by said electronic switching means for supply to the armature circuit of the motor.

* * * * *